US008985762B2

(12) United States Patent
Zider (10) Patent No.: US 8,985,762 B2
(45) Date of Patent: Mar. 24, 2015

(54) EYEGLASS FRAMES (71) Applicant: Robert B. Zider, Portola Valley, CA (US)

(72) Inventor: Robert B. Zider, Portola Valley, CA (US)

(73) Assignee: Beta Frames LLC, Palo Alto, CA (US)

(*) Notice: Subject to any disclaimer, the term of this patent is extended or adjusted under 35 U.S.C. 154(b) by 7 days.

(21) Appl. No.: 13/779,612

(22) Filed: Feb. 27, 2013

(65) Prior Publication Data

US 2014/0240654 A1  Aug. 28, 2014

(51) Int. Cl.
G02C 1/02 (2006.01)
G02C 7/02 (2006.01)
G02C 5/02 (2006.01)
G02C 5/10 (2006.01)
G02C 13/00 (2006.01)

(52) U.S. Cl.
CPC ........ *G02C 1/023* (2013.01); *G02C 7/02* (2013.01); *G02C 5/02* (2013.01); *G02C 5/10* (2013.01); *G02C 13/001* (2013.01)
USPC .......................................... 351/110; 351/178

(58) Field of Classification Search
CPC ............ G02C 1/02; G02C 1/023; G02C 1/10; G02C 13/00; G02C 13/001
USPC ............ 351/42, 110, 140, 143, 144, 154, 178
See application file for complete search history.

(56) References Cited

U.S. PATENT DOCUMENTS

| | | | |
|---|---|---|---|
| 2,851,925 A | 9/1958 | Cretin-Martenaz | |
| 3,639,044 A | 2/1972 | Blair | |
| 3,824,006 A | 7/1974 | Volt | |
| 4,679,918 A * | 7/1987 | Ace | 351/159.62 |
| 4,895,438 A | 1/1990 | Zider | |
| 4,896,955 A | 1/1990 | Zider | |

(Continued)

FOREIGN PATENT DOCUMENTS

DE 212187 7/1909
DE 213310 9/1909

(Continued)

OTHER PUBLICATIONS

Invitation and Search Report on PCT/US 2014/018808.

*Primary Examiner* — Huy K Mai
(74) *Attorney, Agent, or Firm* — T. H. P. Richardson (57) ABSTRACT An eyeglass assembly which comprises
(1) an eyeglass lens comprising a body portion and an engaging portion, and
(2) a frame member which is fitted to the engaging portion, and
(3) a securing member which is bonded to the engaging portion and to surfaces of the frame member which, in the absence of the securing member, are exposed to the atmosphere.

In one method, the assembly is produced by applying a securing member, generally a laminar member, to exposed surfaces of the engaging portion and of the frame member fitted to the engaging portion, and securing the securing member to those exposed surfaces by an adhesive. In another method, the assembly is produced by heating and deforming part of the engaging portion of the lens so that it spreads out over adjacent surfaces of the frame member, thus forming a melt bonded securing member. In another method, the assembly is produced by supplying a polymeric precursor to adjacent surfaces of the engaging portion and the frame member, and heating and deforming the polymeric precursor so that it is melt-bonded to the engaging portion and the frame member.

20 Claims, 2 Drawing Sheets

(56) References Cited

U.S. PATENT DOCUMENTS

| | | |
|---|---|---|
| 5,189,447 A | 2/1993 | Oleson |
| 5,452,028 A | 9/1995 | Iijama |
| 5,640,217 A | 6/1997 | Hautcoeur |
| 5,805,259 A | 9/1998 | Chao |
| 5,861,933 A | 1/1999 | Bac |
| 6,164,775 A | 12/2000 | Zider |
| 6,250,755 B1 | 6/2001 | Conner |
| 6,288,170 B1 | 9/2001 | Wade |
| 6,394,599 B1 | 5/2002 | Blanvillain |
| 6,523,952 B1 | 2/2003 | Krumme |
| 6,752,893 B2 * | 6/2004 | Frieder, Jr. ............... 156/272.2 |
| 6,805,441 B1 | 10/2004 | Loniak |
| 6,827,439 B1 | 12/2004 | Chen |
| 6,843,561 B2 | 1/2005 | Krumme |
| 7,066,594 B2 | 6/2006 | Loniak |
| 7,073,903 B2 | 7/2006 | Rapp |
| 7,588,331 B2 | 9/2009 | Burnstein |
| 8,322,849 B2 | 12/2012 | Krumme |
| 2005/0139309 A1 | 6/2005 | Savoie |
| 2005/0157253 A1 | 7/2005 | Thiele |
| 2005/0253999 A1 | 11/2005 | Lermer |
| 2006/0082722 A1 | 4/2006 | Rapp |
| 2006/0139565 A1 | 6/2006 | Jannard |
| 2006/0250570 A1 | 11/2006 | Friedman |
| 2007/0091255 A1 | 4/2007 | Pilat |
| 2008/0304005 A1 | 12/2008 | DiChiara |
| 2010/0290000 A1 | 11/2010 | Krumme |
| 2011/0187987 A1 | 8/2011 | Zider |

FOREIGN PATENT DOCUMENTS

| | | | |
|---|---|---|---|
| DE | G 9402861 | 7/1994 | |
| DE | U 9406002.9 | 10/1994 | |
| DE | 10320270 | 7/2004 | |
| DE | 10 2006 01709 | 10/2007 | |
| EP | 0790519 | 8/1997 | |
| FR | 2749088 | 11/1997 | |
| FR | 2766586 | 1/1999 | |
| FR | 2 828 744 | 2/2003 | |
| JP | 11-183851 A | 7/1999 | |
| KR | 20-016-4601 Y1 | 2/2000 | |
| KR | 20-021-7876 Y1 | 3/2001 | |
| KR | 20-0376512 Y1 | 3/2005 | |
| WO | WO 00/26715 | 5/2000 | |
| WO | WO 2005/029159 A1 * | 3/2005 | ............ G02C 1/023 |
| WO | WO 2007/044221 | 4/2007 | |
| WO | WO 2010/039176 A1 * | 4/2010 | ............ G02C 1/023 |

* cited by examiner

EYEGLASS FRAMES

BACKGROUND OF THE INVENTION

1. Field of the Invention

This invention relates to eyeglass frames.

2. Introduction to the Invention

U.S. Pat. No. 6,164,775 discloses and claims an eyeglass lens attachment arrangement comprising an eyeglass frame and a pair of lenses, each of the lenses including at least one shaped engaging portion, the shaped engaging portion cooperating with an attachment member which attaches a respective one of the lenses to the eyeglass frame such that the lenses are removably attached to the frame.

International Publication WO 2007/044221 and U.S. Pat. No. 8,322,849 disclose that, in an eyeglass assembly, an engaging portion on an eyeglass lens can be maintained in contact with an eyeglass frame member by means of a removable bonding member (RBM) which (a) contacts the engaging portion and the frame member; and (b) under typical conditions of use of the assembly, maintains the engaging portion and the frame member in direct or indirect contact with each other; and (c) under selected atypical ambient conditions, undergoes a change which separates the engaging portion and the frame member, or permits the engaging portion and the frame member to be separated from each other by pulling them apart manually.

The removable bonding member is preferably a removable bonding adhesive (RBA).

International Publication WO 2010/039176 and U.S. application Ser. No. 12/998,271 disclose that when contacting surfaces of (i) an engaging portion on an eyeglass lens and (ii) an eyeglass frame member are to be maintained in contact, improved results can be obtained by (A) providing (i) a passage which passes away from the contacting surface of the frame member, preferably to an exterior surface of the frame member, and/or (ii) a passage which passes away from the contacting surface of the engaging portion, preferably to an exterior surface of the engaging portion, (B) coating at least part of the contacting surfaces of one or both of the engaging portion of the lens and the frame member with a composition which is relatively soft when the contacting surfaces of the lens and the frame member are brought into contact, (C) bringing the contacting surfaces into contact in such a way that the composition is forced into the passage, (D) treating the composition so that it hardens (the treatment being for example exposure to ultraviolet or other radiation, or simply leaving the composition to harden at ambient temperature and pressure), thus providing a physical lock which helps to secure the lens and the frame member together. WO 2010/039176 and U.S. application Ser. No. 12/998,271 also disclose that the union between the frame member and the engaging portion can be strengthened by inserting a metal or polymer rod or tube through a hole drilled through the frame member and into the engaging portion of the eyeglass lens.

International Patent Application No. PCT/US 2012/054524 and U.S. application Ser. No. 13/199,896 disclose a temple arm for an eyeglass frame, the temple arm comprising (1) a side member, (2) an auxiliary member, and (3) a return member which comprises an attachment portion for fitting to (preferably fitting around or into) an engaging portion on the periphery of a lens; the auxiliary member (i) being connected to the side member and to the front of the return member, and (ii) providing a front surface of the temple arm.

U.S. Pat. Nos. 4,895,438, 4,896,955, 6,523,952 and 6,843,561 disclose improved eyeglass frames, some of which make use of a member composed of a shape-memory alloy (often hereinafter abbreviated to SMA) and/or a lens including a shaped engaging portion.

U.S. Pat. No. 6,394,599 discloses eyeglasses which comprise a lens having an engaging portion extending from the periphery of an eyeglass lens, and a frame member having a recess which is open on at least one side, so that it can be engaged with engaging portions of different thicknesses.

The entire disclosure of each of the U.S. Patents, the international publications and the corresponding US national phase applications referred to above is incorporated herein by reference for all purposes.

Conventional eyeglasses include two lenses, a bridge member which is attached to each lens and which rests on the nose of the wearer, and two temple members each of which is secured to one of the lenses and which rest on the ears of the wearer. The terms "eyeglass frame member", "frame member" and "frame" are used herein to include temple members, bridge members, and auxiliary members to which a temple member or a bridge member is, or can be, secured. Such members can for example be composed of a metallic and/or polymeric material.

SUMMARY OF THE INVENTION

In one aspect, this invention provides an assembly which comprises (1) an eyeglass lens comprising a body portion and an engaging portion, and (2) a frame member which is fitted to the engaging portion, and (3) a securing member which is bonded to the engaging portion and to surfaces of the frame member which, in the absence of the securing member, are exposed to the atmosphere.

In some embodiments the invention, the assembly is produced by applying a securing member, generally a laminar member, to exposed surfaces of the engaging portion and of the frame member fitted to the engaging portion, and securing the securing member to those exposed surfaces by an adhesive. In other embodiments, the assembly is produced by heating and deforming part of the engaging portion of the lens so that it spreads out over adjacent surfaces of the frame member, thus forming a securing member. In other embodiments, the assembly is produced by supplying a polymeric precursor to adjacent surfaces of the engaging portion and the frame member, and heating and deforming the polymeric precursor so that it is bonded to the engaging portion and the frame member.

This invention can be used in place of, or in conjunction with, previously proposed methods for securing a frame member to an eyeglass lens, for example as disclosed in the documents Incorporated by reference herein.

The invention preferably does not make use of screws to secure the frame member to the lens, as is preferred for example in the assembly disclosed in U.S. Pat. No. 6,394,599.

Preferably, the eyeglass frame member is secured to the engaging portion in such a way that the field of the wearer's vision through the lens is completely free of obstructions.

An advantage of the invention, as compared to the known processes in which a generally tubular portion of a frame member is fitted to an engaging portion on a lens, is that the security of the connection is less dependent on precise matching of the dimensions of the tubular portion and the engaging portion.

In describing and claiming the invention, reference will generally be made to securing a single frame member to a single engaging portion on an eyeglass lens. The frame member can be a bridge member or a temple member, or a frame member which can be later connected to another frame member to form a bridge member or a temple member. A completed eyeglass assembly conventionally includes (1) two lenses, each of which has two engaging portions, (2) a bridge member which is attached to one of the engaging portions of each lens and which, when the eyeglass frame assembly is in use, rests on the nose of the wearer, and (3) two temple members each of which is secured to the other engaging portion of one of the lenses and which, when the eyeglass frame assembly is in use, rest on the ears of the wearer. In a completed eyeglass assembly making use of this invention, preferably each of the frame members is secured to a respective engaging portion of a lens in the same way. However, the invention includes the possibility that not all the connections between the frame members and the lenses are the same, so long as at least some of the connections are in accordance with the invention.

BRIEF DESCRIPTION OF THE DRAWINGS

The invention is illustrated in the accompanying drawings, which are diagrammatic and not to scale, which illustrate only the terminal part of the frame member which become secured to the engaging portion of the eyeglass lens, and in which

FIGS. 8-12 show progressive stages of another method in which an adhesive-coated securing member is secured to an engaging portion of a lens and a tubular portion of a frame member.

FIGS. 13-16 show progressive steps in a method in which the end of an engaging portion is deformed by heat to provide a securing member which is bonded to the frame member.

FIG. 17 shows an initial stage in a method in which a precursor of a polymeric securing member is delivered to the end of an engaging portion and the tubular portion of a frame member surrounding the engaging portion, so that the securing member can be heated and deformed to provide a securing member.

DETAILED DESCRIPTION OF THE INVENTION

In the Summary of the Invention above, the Detailed Description of the Invention below, and the accompanying drawings, reference is made to particular aspects and features (including for example components, ingredients, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed herein includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus "comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

This specification incorporates by reference all documents referred to herein and all documents filed concurrently with this specification or filed previously in connection with this application, including but not limited to such documents which are open to public inspection with this specification. Various preferred aspects of the invention are described in detail below.

(1) In a first preferred aspect, this invention provides an eyeglass frame assembly which comprises a frame member, an engaging portion on an eyeglass lens to which the frame member is fitted, and a securing member which (i) is not directly connected to the engaging portion or to the frame member and (ii) is secured to the frame member and the engaging portion by an adhesive.

An eyeglass frame according to the first preferred aspect can be made by a method which comprises
(1) fitting a frame member to an engaging portion on an eyeglass lens,
(2) providing a securing member which is not part of the engaging portion or of the frame member,
(3) placing an adhesive between the securing member and the frame member and between the securing member and the engaging portion, and
(4) placing the securing member adjacent to the frame member and the engaging portion, with the adhesive between the securing member and the frame member and between the securing member and the engaging portion.

When a suitable adhesive has been used and/or a suitable securing member has been used in the first aspect of the invention, as further described below, an eyeglass assembly according to the first preferred aspect of the invention can be disassembled by subjecting the assembly to conditions which do not damage the engaging portion or the frame member but which weaken the strength of the adhesive and/or deteriorate the securing member so that it is no longer effective. Preferably the conditions are such that the frame member can be disassembled from the engaging portion by pulling them apart manually.

(2) In a second preferred aspect, this invention provides an eyeglass frame assembly which comprises a frame member, an eyeglass lens having an engaging portion to which the frame member is fitted, and a polymeric securing member which is melt bonded to the engaging portion and to the frame member, and secures the engaging portion to the frame member. The term "melt bonded" means that the polymeric securing member is in intimate contact with the engaging portion and the frame member as a result of being contacted with the engaging portion of the frame member while the polymeric composition is above its melting point.

An assembly according to the second preferred aspect of the invention can be made by a method which comprises
(1) fitting a frame member to an engaging portion on an eyeglass lens,
(2) after step (1), heating part of the engaging portion so that the heated part of the engaging portion can be deformed, and
(3) deforming the heated part so that it secures the frame member to the engaging portion.

An assembly according to the second preferred aspect of the invention can also be made by a method which comprises
(1) fitting a frame member to an engaging portion on eyeglass lens,
(2) after step (1) applying a polymeric precursor of the securing member to the frame member and the engaging portion,
(3) heating the polymeric precursor to a temperature above its melting point, and
(4) deforming the polymeric precursor to form the securing member.

An assembly according to the second preferred aspect of the invention can be disassembled by removing at least part of the polymeric securing member, for example by cutting, grinding, or melting the securing member The process preferably enables the frame member to be disassembled from the lens by pulling them apart manually.

The invention can optionally make use of combinations of two or more of the features set out above and below, insofar as those features are applicable to the different aspects of the invention. The features set out above and enumerated below can optionally be present in any combination of two or more of those features, except when the features are mutually exclusive.

The Lens.

(1) In all the different embodiments of the invention, the engaging portion of the lens is preferably a member projecting from the periphery of the lens, so that the periphery of the lens is continuous and a wearer's field of vision is free of obstructions. However, the engaging portion can also be:—
(a) A member projecting from the front or back of the lens.
(b) A recess in the lens. The recess can have one or more of the following features.

(i) it extends through the thickness of the lens;
(ii) it extends from the back of the lens but not through the front of the lens;
(iii) it extends from the front of the lens but not through the back of the lens;
(iv) it is wholly within the lens, so that the periphery of the lens is continuous;
(v) it extends through the periphery of the lens, so that at most part of the periphery of the lens is continuous;
(vi) it extends through the periphery of the lens and does not interrupt the front or the back of the lens;
(vii) the periphery of the recess is smoothly curved, for example is in the shape of a circle or an oval;
(viii) the periphery of the recess comprises at least one straight section, and optionally at least one smoothly curved section, for example is in the shape of a regular polygon, e.g. a square, or a rectangle;
(ix) the recess includes a raised central portion; the height of the raised central portion can be less than, the same as, or greater than, the depth of the recess; the shape of the edge of the raised central portion can be the same as, or different from, the shape of the periphery of the recess; for example, the cross-section of the periphery can be a regular or irregular annulus.

(2) The body portion and the engaging portion of the lens are monolithic, for example are produced by machining or otherwise shaping a block of optical material, for example a polycarbonate or like transparent polymeric material.

(3) The engaging portion comprises a member which is permanently secured (including welded) to the body portion and which projects from the periphery of the lens, which is preferred, or from the back or from the front of the lens.

(4) The engaging portion and/or the frame member comprises at least one physical feature which assists in placing them in a desired position relative to each other, for example features which permit sliding contact in one dimension only, and/or which prevent relative rotation of the engaging portion and the frame member when they are in a desired position relative to each other.

(5) The engaging portion and/or the frame member include physical and/or compositional features which make it easier to assemble and disassemble the assembly. In some exemplary embodiments, the engaging portion and/for the frame member can include apertures, e.g. channels, through which fluids, e.g. heated liquids or gases, can contact the securing member. In other exemplary embodiments, the engaging portion and/or the frame member is constructed of a material which is relatively transparent to electromagnetic or ultrasonic radiation or which is a good conductor of heat.

The Frame Member.

The frame member is fitted to the engaging portion on the eyeglass lens. For this purpose, the frame member preferably comprises a terminal portion having dimensions such that it can be closely fitted to the engaging portion. Many different engaging portions and corresponding terminal portions are disclosed in the documents Incorporated by reference. However, as noted above, the engaging portion of the lens preferably projects from the periphery of lens, in which case the frame member preferably comprises a generally tubular portion which fits over the engaging portion. In many cases, the engaging portion has a generally rectangular (including square) cross-section, and the terminal portion of the frame member is open at both ends and has a corresponding generally rectangular tubular cross-section. The tubular portion preferably has a closed cross-section so that it fits completely around the engaging portion, but the invention includes the possibility that the tubular portion has at least one side which is incomplete, or which is completely missing so that the tubular cross-section has only three sides Further Details of the First Aspect of the Invention.

In the first aspect of the invention, a securing member is secured by an adhesive to the frame member and the engaging portion. The securing member should have a melting point above the temperatures to which eyeglass assemblies are normally exposed, for example a melting point of at least 50° C., preferably at least 60° C. The securing member is preferably a thin sheet of a polymeric composition. The polymer can for example have a melting point of 60-90° C. or 105-150° C. Suitable polymers include polycarbonates and polyethylenes. However, the invention includes the possibility that the securing member is made of non-polymeric material, and/or is not laminar, for example to provide a decorative function.

The securing member should be large enough to cover a sufficiently large area of each of the frame member and the engaging portion to ensure that it secures them together. Preferably, the securing member, in a completed assembly, does not extend beyond the frame member or the engaging portion. However, in order to assist in placing the securing member correctly, it can include a tab which extends from the periphery of the securing member and which is removed (e.g. by cutting or grinding) before the assembly is complete. Similarly, if any part of the securing member extends beyond the frame member and the engaging portion, it can be removed (e.g. by cutting or grinding) before the assembly is complete.

The surface of the securing member adjacent to the frame member and the engaging portion can be roughened in order to improve the adhesive bond between the securing member and the frame member and the engaging portion.

In a preferred embodiment of the first aspect of the invention
(1) (i) the engaging portion extends from the periphery of the lens, (ii) the terminal portion is a generally tubular portion which (a) is open at both ends and (b) surrounds the engaging portion on all sides, and (iii) the exposed end of the engaging portion and the surfaces of the terminal portion remote from the lens lie in the same plane, and
(2) the securing member is secured by the adhesive to the exposed end of the engaging portion and to the surfaces of the terminal portion which lie in the same plane.

In another embodiment of the first aspect of the invention
(1) (i) the engaging portion extends from the periphery of the lens, (ii) the terminal portion is a generally tubular portion which (a) is open at both ends and on one side, and (b) surrounds three sides of the engaging portion, and (iii) the exposed side of the engaging portion and the surfaces of the generally tubular portion which are generally parallel to the plane of the lens lie in the same plane, and
(2) the securing member is secured by the adhesive to the exposed side of the engaging portion and to the surfaces of the terminal portion which lie in the same plane.

Any adhesive can be used to secure the securing member to the engaging portion and the frame member, providing that it remains effective under typical conditions of use of the assembly. The adhesive, or a precursor of the adhesive, can be applied to the securing member and/or to the engaging portion and/or to the frame member before the securing member is brought into contact with the engaging portion and the frame member. The adhesive can be one which is applied as a precursor and which is converted to an effective adhesive by a specific treatment, for example by exposure to heat and/or electromagnetic radiation. Preferably the adhesive shrinks by less than 10%, preferably less than 3%, particularly less than 1.5%, by volume and/or linearly, when it is converted from the precursor to the adhesive (since excessive shrinkage of the adhesive on curing can induce stress in the engaging portion and/or the frame member).

In order to make it possible to disassemble the eyeglass frame assembly (as is often desirable, for example to remove the lens to be repolished), the adhesive can be one which can be weakened by exposure to conditions which will not damage the lens or the frame member, and preferably weakened to an extent that the lens and the frame member can be separated from each other by pulling them apart manually. Such adhesives include the adhesives which are referred to in U.S. Pat. No. 8,322,849 as removable bonding adhesives (RBAs). When such an adhesive is used, a securing member according to the present invention can be used in conjunction with the procedure described and claimed in U.S. Pat. No. 8,322,849, in which an RBA adhesive is used to secure the engaging portion of an eyeglass lens to an eyeglass frame member. In that case, the adhesive used to secure the securing member to the engaging portion and the frame member is preferably the same as the adhesive used to secure the engaging portion and the eyeglass frame member.

Such adhesives can for example have one or more of the following characteristics.
(i) it is known to those skilled in the art for bonding fiber-optic components; and/or
(ii) it is a one part adhesive or a two-part adhesive; and/or
(iii) it adheres to both metals and polymeric materials, for example to a metal frame member and a polymeric engaging portion; and/or
(iv) as a precursor, it comprises 15-40% e.g. 19-30%, of an aliphatic amide, e.g. an amide similar to that having CAS No. 2680-03-7, 10-30%, e.g. 14-25%, of a high boiling acrylate or methacrylate, 0.5-6%, e.g. 1-4%, of a photoinitiator, e.g. a photoinitiator similar to that having the CAS number 947-19-3, 30-55%, e.g. 35-46%, of a urethane acrylic oligomer, and 5-30%, 9-18%, of a vinyl monomer; and/or
(v) it is one of the adhesives available from Dymax Corp. under the trade name Ultra Light-Weld 3094 Series; and/or
(vi) it comprises a polymeric matrix and, distributed in the matrix, a material, for example a particulate material, e.g. a ferrite, which generates heat when exposed to selected electromagnetic radiation, e.g. ultraviolet radiation.

The conditions to which the eyeglass frame assembly is subjected when it is disassembled, and which weaken the adhesive, preferably comprise one or more of
(a) a temperature greater than 50° C., for example 50 to 150° C., 50 to 100° C., or 60 to 90° C.;
(b) immersion in a liquid, for example a heated liquid, which may be an aqueous liquid which is free of organic materials; an organic liquid which is free of water and other inorganic materials; or a mixed aqueous/organic liquid;
(c) immersion in a bath of heated solid particles, e.g. a bath of heated glass particles;
(d) exposure to electromagnetic radiation outside the visible wavelengths; and
(e) exposure to ultrasonic radiation.

It is also possible to make an eyeglass frame assembly which can be disassembled by using a securing member which can be rendered ineffective by treatment which does not damage the lens or the frame member. For example, the securing member can be made of a polymer which can be melted or dissolved by a solvent.

Further Details of the Second Aspect of the Invention.

The second aspect of the invention provides an eyeglass frame assembly which comprises a frame member, an eyeglass lens having an engaging portion to which the frame member is fitted, and a polymeric securing member which is melt bonded to the engaging portion and to the frame member, and secures the engaging portion to the frame member. The polymeric securing member is preferably composed of a polymeric composition which is based upon the same polymer as the polymeric composition of the engaging portion, thus ensuring a good bond between the securing member and the engaging portion. For example, many eyeglass lenses are composed of a polycarbonate composition, in which case the polymeric securing member is preferably also composed of a polycarbonate composition. The polymeric securing member is preferably produced by heating a part of the engaging portion and deforming the heated part of the engaging portion so that it secures the frame member to the engaging portion.

In one embodiment of the second aspect of the invention,
  (1) (i) the engaging portion extends from the periphery of the lens and has a proximal part adjacent to the lens and a distal part remote from the lens, (ii) the terminal portion of the frame member is a generally tubular portion which (a) is open at both ends and (b) surrounds the proximal part of the engaging portion on all sides, and does not surround the distal part of the engaging portion, and
  (2) the distal part of the engaging portion has been heated and deformed to form the polymeric securing member.

An assembly of this kind can be obtained by a method in which the terminal portion of the frame member is fitted to the proximal part of the engaging portion, and then the distal part of the engaging portion is heated and deformed to provide the securing member. When an assembly of this kind is to be disassembled, the polymeric securing member can be cut off along the plane which includes the remote end of the generally tubular portion of the frame member.

In another embodiment of the second aspect of the invention,
  (1) (i) the engaging portion extends from the periphery of the lens, (ii) the terminal portion of the frame member is a generally tubular portion which (a) is open at both ends and (b) surrounds the engaging portion on all sides, and (iii) the end of the engaging portion remote from the lens lies in the same plane as the surfaces of the terminal portion remote from the lens lie in the same plane, or just below that plane, and
  (2) a polymeric securing member is melt bonded to the end of the engaging portion remote from the lens and to the surfaces of the terminal portion remote from the lens.

An assembly of this kind can be obtained by a method in which a precursor of the polymeric securing member is applied to the remote end of the engaging portion and to the remote surfaces of the terminal portion, and is then heated and deformed to form the securing member. If the remote end of the engaging portion and the remote surfaces of the terminal portion lie in the same plane, an assembly of this kind can be disassembled by removing the polymeric securing member, e.g. by grinding or by cutting, along the plane which includes the remote end of the engaging portion and the remote surfaces of generally tubular terminal portion of the frame member.

In another embodiment of the second aspect of the invention,
  (1) (i) the engaging portion extends from the periphery of the lens, (ii) the terminal portion of the frame member is a generally tubular portion which (a) is open at both ends and on one side, and (b) surrounds three sides of the engaging portion, and (iii) the exposed side of the engaging portion and the surfaces of the generally tubular portion which are generally parallel to the plane of the lens lie in the same plane, or the exposed side of the engaging portion lies just below the plane including the surfaces of the generally tubular portion which are generally parallel to the plane of the lens, and
  (2) the securing member is melt bonded to the exposed side of the engaging portion and to the surfaces of the terminal portion which are generally parallel to the plane of the lens.

An assembly of this kind can be obtained by a method in which a precursor of the polymeric securing member is applied to the exposed side of the engaging portion and to the surfaces of the terminal portion which are generally parallel to the plane of the lens, and is then heated and deformed to form the securing member.

The invention includes tools which can be used in the manufacture of eyeglass assemblies of the second aspect of the invention, for example
(A) a tool which
  (1) comprises a terminal portion which is
    (a) shaped so that it fits over an exposed part of an engaging portion of an eyeglass lens, after a frame member has been fitted to the engaging portion,
    (b) can be heated to a temperature which is controlled within the range 140-220° C., and
  (2) a handle, and
(B) a tool which
  (1) comprises a terminal portion which is
    (a) shaped so that a precursor for a polymeric securing member can be retained therein,
    (b) can deliver the precursor to the exposed surfaces of an engaging portion of a lens and of a frame member which is fitted to the engaging portion, and can heat and deform the precursor to provide a polymeric securing member which is melt bonded to the engaging portion and to the frame member, and
  (2) a handle.

THE DRAWINGS

In the drawings,
1 denotes an eyeglass lens,
11 denotes an engaging portion extending from the periphery of the lens, and part of which, denoted 12, is exposed in some of the Figures,
2 denotes the terminal tubular portion of a frame member, the remainder of which is not shown,
3 denotes a laminar securing member which is coated with adhesive (not shown) on the surface facing the lens,
32 denotes a tab on the securing member to assist the correct placing of the securing member,
4 denotes a polymeric securing member which is melt bonded to the engaging portion and to the tubular portion of the frame member,
41 denotes a precursor for a polymeric securing member,
7 denotes a tool having a handle 71 and a terminal portion 72 which can be heated to a controlled temperature and which is shaped so that it fits over, heats and deforms an exposed part 12 of an engaging member 11, and thus creates a polymeric securing member 4 which is melt bonded to the engaging portion and the frame member, and

8 denotes a tool having a handle 81, and a terminal portion 82 which carries a precursor 41 for a polymeric securing member which the tool can deliver to a surface comprising part of the engaging portion 11 and part of the tubular portion 2, and can heat and deform the delivered precursor to create a polymeric securing member which is melt bonded to the engaging portion and the frame member.

Figure 1:
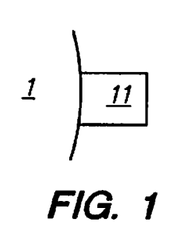
FIGS. 1-7 show progressive stages of a method in which an adhesive-coated securing member is secured to an engaging portion of a lens and a tubular portion of a frame member.
Figure 2:
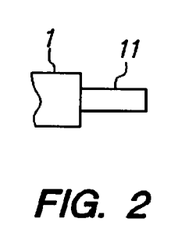
Figure 3:
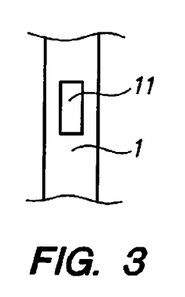
Figure 4:
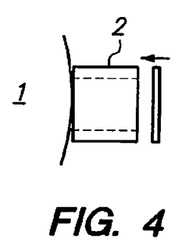
Figure 5:
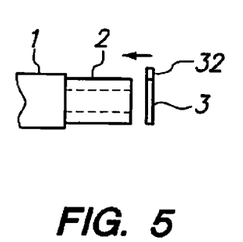

FIGS. 1, 2 and 3 are front, top and side views of an eyeglass lens 1 having a body portion and an engaging portion 11 extending from the periphery of the body portion, FIGS. 4 and 5 are front and top views of the eyeglass lens 1 and a 4-sided terminal tubular portion 2 of a frame member which is fitted over the engaging portion, and an adhesive-coated securing member 3 which is ready to be applied to the exposed surfaces of the engaging portion and the tubular portion which lie in the same plane. The securing member has a tab 32 to assist in the correct placing of the securing member.

Figure 6:
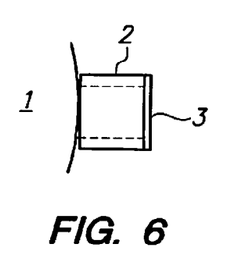
Figure 7:
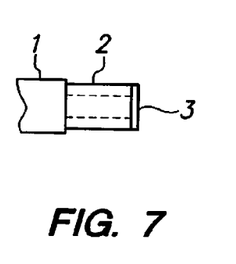
Figure 8:
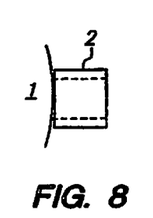
Figure 9:
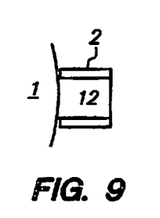
Figure 10:
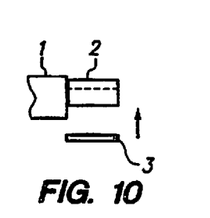

FIGS. 6 and 7 are front and top views of FIGS. 4 and 5 after the adhesive coated securing member 3 has been secured to the engaging portion and the tubular portion, and the tab 32 has been removed, FIGS. 8, 9 and 10 are rear, front and top views of an eyeglass lens 1 having an engaging portion 11 extending from the periphery of the lens, and a 3-sided terminal tubular portion of a frame member fitted to the engaging portion, and an adhesive-coated securing member ready to be applied to the exposed side surfaces of the engaging portion and of the tubular portion.

Figures 11, 12, 13, 14:
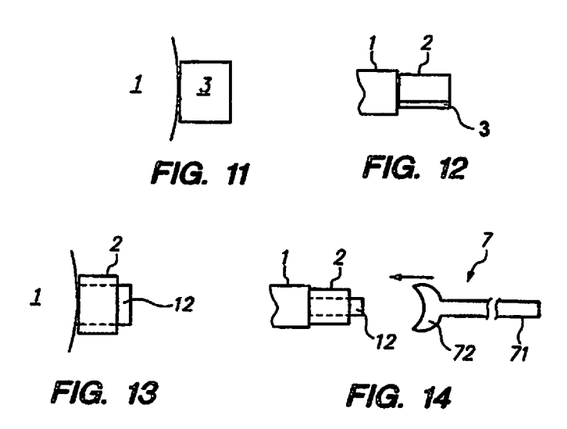
Figure 15:
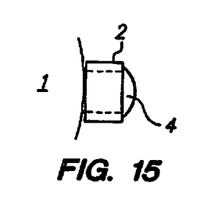

FIGS. 11 and 12 are front and top views of FIGS. 9 and 10 after the adhesive coated securing member 3 has been secured to the engaging portion and the tubular portion, FIGS. 13 and 14 are front and top views of an eyeglass lens 1 having an engaging portion 11 extending from the periphery of the lens and a 4-sided terminal tubular portion of a frame member fitted over the engaging portion. The size of the tubular portion is such that a distal portion of the engaging portion extends away from the tubular portion. FIG. 14 also shows a thermoforming tool which is ready to be applied to the distal portion of the engaging portion, FIGS. 15 and 16 are front and top views of FIGS. 13 and 14 after the thermoforming tool has been used to heat and deform the distal portion of the engaging portion to provide a polymeric securing member 4.

FIG. 17 is a side view of an eyeglass lens having an engaging portion 11 extending from the periphery of the lens and a 4-sided terminal tubular portion of a frame member fitted around the engaging portion. FIG. 17 also shows a tool 8 having a handle 81 and a terminal portion 82 which carries a precursor 41 for a polymeric securing member. The tool can deliver the precursor 41 to the exposed surfaces of the engaging portion and the tubular portion, and can heat and deform the precursor so that it provides a polymeric securing member.

The invention claimed is:

1. An eyeglass assembly which is exposed to an ambient atmosphere and which comprises
   (1) an eyeglass lens comprising (i) a body portion having a periphery, and (ii) an engaging portion which extends from the periphery of the lens,
   (2) a frame member which is fitted to the engaging portion, and
   (3) a laminar securing member which is bonded by an adhesive (a) to surfaces of the frame member which, in the absence of the securing member, are exposed to the ambient atmosphere and (b) to surfaces of the engaging portion which, in the absence of the securing member, are exposed to the ambient atmosphere, thereby securing the eyeglass lens and the frame member to each other.

2. An eyeglass assembly according to claim 1 wherein the securing member is a sheet of a polymeric composition having a melting point of at least 60° C.

3. An eyeglass assembly according to claim 1 wherein the securing member can be melted or dissolved in a solvent by treatment which does not damage the lens or the frame member.

4. An assembly according to claim 1 wherein
   (1) the frame member has a generally tubular terminal portion which (i) is open at both ends, (ii) has a closed cross-section, and (iii) surrounds the engaging portion,
   (2) the engaging portion has an end surface which is remote from the lens,
   (3) the terminal portion has surfaces which (i) are remote from the lens and (ii) lie in substantially the same plane as the end surface of the engaging portion, and
   (4) the surfaces of the frame member and the engaging portion to which the securing member is bonded by the adhesive are the end surface of the engaging portion and the surfaces of the terminal portion which lie in substantially the same plane as the end surface of the engaging portion.

5. An assembly according to claim 1 wherein
   (1) the frame member has a generally tubular terminal portion which (a) is open at both ends and on one side, (b) surrounds three sides of the engaging portion, and (c) has side surfaces extending away from the lens,
   (2) the engaging portion has a side surface extending away from the lens,
   (3) the side surface of the engaging portion lies in substantially the same plane as the side surfaces of the terminal portion, and
   (4) the surfaces of the frame member and the engaging portion to which the securing member is bonded by the adhesive are the side surface of the engaging portion and the surfaces of the terminal portion which lie in substantially the same plane as the side surface of the engaging portion.

6. An assembly according to claim 1 wherein the adhesive which bonds the securing member to the frame member and to the engaging portion is a removable bonding adhesive (RBA) which
   (i) under typical conditions of use of the assembly bonds the securing member to the frame member and the engaging portion to each other, and
   (ii) under selected a typical ambient conditions, undergoes a reduction in adhesive strength which permits the engaging portion and the frame member to be separated from each other by pulling them apart manually.

7. An assembly according to claim 6 wherein there is also an adhesive which lies between the engaging portion and the frame member, and the adhesive is the same as the adhesive which bonds the securing member to the frame member and the engaging portion.

8. A method of making an assembly according to claim 1 which comprises
   (1) providing the laminar securing member,
   (2) bringing the frame member and the engaging portion together so that adjacent surfaces of the frame member and the engaging portion lie in substantially the same plane and are exposed to the ambient atmosphere, (3) placing an adhesive or a precursor of an adhesive between the securing member and said surfaces, and
(4) contacting the securing member with said surfaces, with the adhesive or the precursor of an adhesive between the securing member and said surfaces.

9. A method according to claim 8 wherein (1) the frame member has a generally tubular terminal portion which (i) is open at both ends, (ii) has a closed cross-section, and (iii) surrounds the engaging portion, and
(2) the adjacent surfaces are an end surface of the engaging portion and end surfaces of the terminal portion.

10. A method according to claim 8 wherein
(1) the frame member has a generally tubular terminal portion which (a) is open at both ends and on one side, (b) surrounds three sides of the engaging portion, and (c) has side surfaces extending away from the lens,
(2) the engaging portion has a side surface extending away from the lens, and
(3) the adjacent surfaces are the side surface of the engaging portion and the side surfaces of the terminal portion.

11. An eyeglass assembly which is exposed to an ambient atmosphere and which comprises
(1) an eyeglass lens comprising (i) a body portion having a periphery, and (ii) an engaging portion which extends from the periphery of the lens,
(2) a frame member which is fitted to the engaging portion, and
(3) a securing member which is melt-bonded to (a) surfaces of the frame member which, in the absence of the securing member, are exposed to the ambient atmosphere and (b) surfaces of the engaging portion which, in the absence of the securing member, are exposed to the ambient atmosphere, thereby securing the eyeglass lens and the frame member to each other.

12. An assembly according to claim 11 wherein the securing member is composed of a polymeric composition which is based upon the same polymer as the polymeric composition of the engaging portion.

13. An eyeglass assembly according to claim 11 wherein the securing member can be melted or dissolved in a solvent by treatment which does not damage the lens or the frame member.

14. An assembly according to claim 11 wherein
(1) the frame member has a generally tubular terminal portion which (i) is open at both ends, (ii) has a closed cross-section, and (iii) surrounds the engaging portion,
(2) the engaging portion has an end surface which is remote from the lens,
(3) the terminal portion has surfaces which (i) are remote from the lens and (ii) lie in substantially the same plane as the end surface of the engaging portion, and
(4) the surfaces of the frame member and the engaging portion to which the securing member is melt-bonded are the end surface of the engaging portion and the surfaces of the terminal portion which lie in substantially the same plane as the end surface of the engaging portion.

15. An assembly according to claim 11 wherein
(1) the frame member has a generally tubular terminal portion which (a) is open at both ends and on one side, (b) surrounds three sides of the engaging portion, and (c) has side surfaces extending away from the lens,
(2) the engaging portion has a side surface extending away from the lens,
(3) the side surface of the engaging portion lies in substantially the same plane as the side surfaces of the terminal portion,
(4) the surfaces of the frame member and the engaging portion to which the securing member is melt-bonded are the side surface of the engaging portion and the surfaces of the terminal portion which lie in substantially the same plane as the side surface of the engaging portion.

16. A method of making an assembly according to claim 11 which comprises
(1) providing the laminar securing member,
(2) bringing the frame member and the engaging portion together so that adjacent surfaces of the frame member and the engaging portion lie in substantially the same plane and are exposed to the ambient atmosphere,
(3) placing the securing member against said adjacent surfaces, and
(4) heating and melting the securing member so that it secures the engaging portion and the frame member to each other.

17. A method according to claim 16 wherein
(1) the frame member has a generally tubular terminal portion which (i) is open at both ends, (ii) has a closed cross-section, and (iii) surrounds the engaging portion,
(2) the engaging portion has an end surface which is remote from the lens and which lies in substantially the same plane as end surfaces of the generally tubular terminal portion, and
(3) the adjacent surfaces are the end surfaces of the terminal portion and the engaging portion.

18. A method according to claim 16 wherein
(1) the frame member has a generally tubular terminal portion which (a) is open at both ends and on one side, (b) surrounds three sides of the engaging portion, and (c) has side surfaces extending away from the lens,
(2) the engaging portion has a side surface extending away from the lens and which lies in substantially the same plane as the side surfaces of the generally tubular terminal portion, and
(3) the adjacent surfaces are the side surface of the engaging portion and the side surfaces of the generally tubular terminal portion.

19. An eyeglass assembly which is exposed to an ambient atmosphere and which comprises
(1) an eyeglass lens comprising (i) a body portion having a periphery and (ii) a polymeric engaging portion which extends from the periphery of the lens, the engaging portion having a proximal part adjacent to the lens and a distal part remote from the lens,
(2) a frame member having a generally tubular terminal portion which (i) is open at both ends, (ii) surrounds the proximal part of the engaging portion and (iii) does not surround the distal part of the engaging portion, and
(3) the distal part of the engaging portion being deformed to form a melt-bonded polymeric securing member which contacts surfaces of the frame member which, in the absence of the securing member, are exposed to the ambient atmosphere, thereby securing the frame member to the engaging portion.

20. A method of making an assembly according to claim 19 which comprises
(1) fitting the terminal portion of the frame member to the proximal part of the engaging portion, and
(2) heating and deforming the distal part of the engaging portion to form a melt-bonded polymeric securing member which secures the frame member to the engaging portion.

* * * * *